United States Patent Office 2,751,121
Patented June 19, 1956

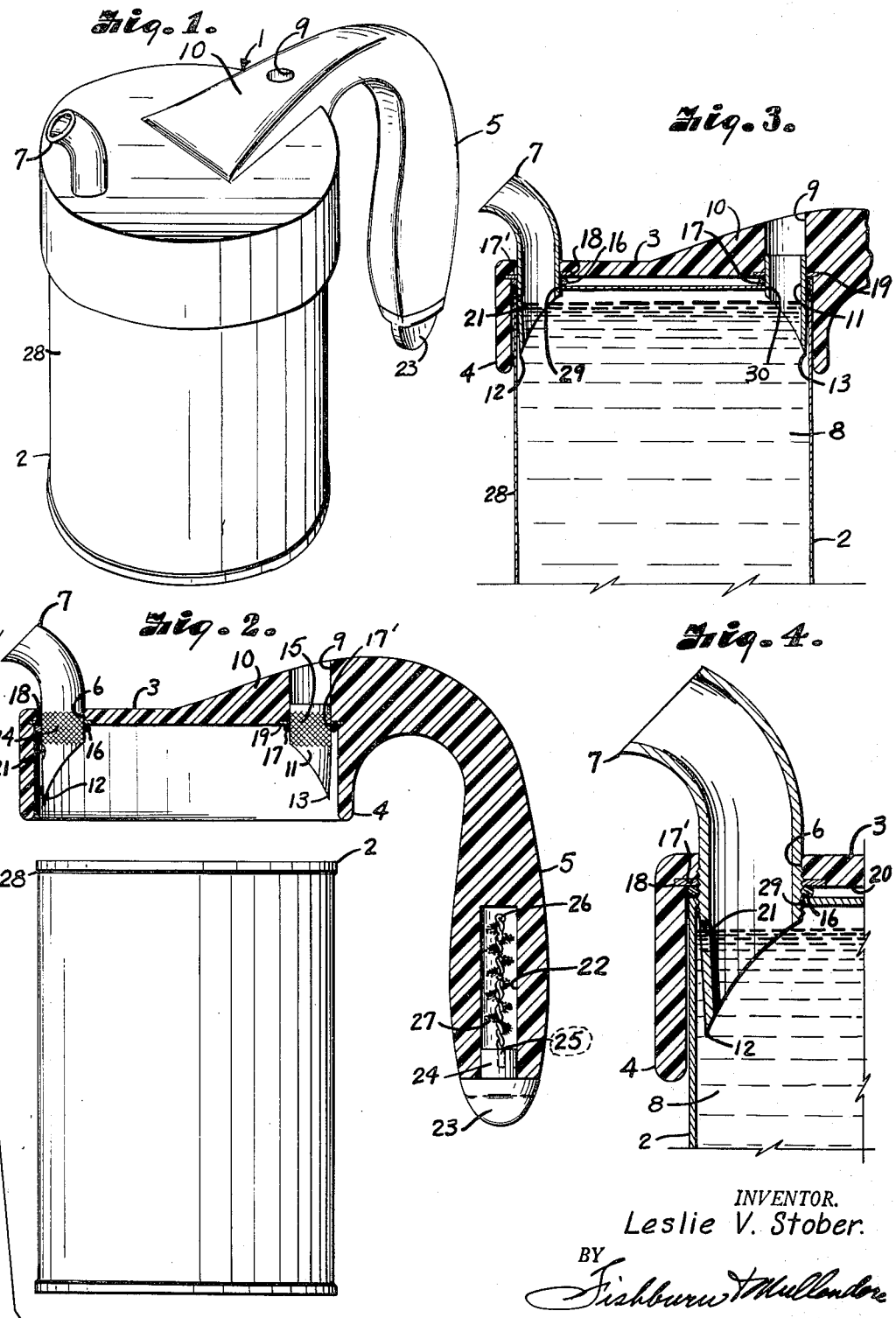

2,751,121

DISPENSER

Leslie V. Stober, Kansas City, Mo.

Application July 25, 1952, Serial No. 300,816

2 Claims. (Cl. 222—85)

This invention relates to a holder and dispenser for milk cans, and more particularly to a device for puncturing the tops of condensed milk cans and the like, holding the dispenser on the can and dispensing the milk therefrom.

The principal object of the present invention is to provide a device for engaging over the top of a milk can or the like, puncturing the top of the can, holding the can within the dispenser and dispensing the milk therefrom.

Other objects of the present invention are to provide a holder in which a can may be securely held within the holder and the latter employed on the table or other desired place for dispensing the contents of the can in desired quantities without the contents dripping or running from the sides of the holder; to provide a handle on the holder; to provide a spout for dispensing contents from the can, the spout having its end tapered to pierce the top of the can as it is pressed thereon; to provide an air vent opposite the spout and through the handle of the holder, the air vent having its inner end pointed to pierce the top of the can so that air will escape therethrough as milk is poured from the can; to provide means for sealing the spout and air tube in the top of the holder; to provide means on said spout and said air vent for engaging the wall of the opening made in the top of the can to retain the holder on the can for the dispensing operation; to provide means in the spout near the underneath side of the top of the container whereby substantially all of the contents may be dispensed from the container; to provide a receptacle in the end of the handle for containing a brush for cleaning the spout and receptacle; and to provide a device of this character simple and efficient in operation.

In accomplishing these and other objects of the present invention, I have provided improved details of structure, the preferred form of which is illustrated in the accompanying drawing, wherein:

Fig. 1 is a perspective view of a dispenser embodying the features of my invention.

Fig. 2 is a side view, partly in cross section, particularly illustrating the knurled or roughened portions of the spout and air tube for engaging the side of the opening made in the top of the can to retain the holder on the can and the rubber sealing ring.

Fig. 3 is a partial side view, particularly illustrating the holder and dispenser after it is applied to the can.

Fig. 4 is a detailed fragmentary section particularly illustrating the pouring spout and air tube openings in the top.

Referring more in detail to the drawings:

1 designates a milk can holder and dispenser embodying the features of my invention adapted to be applied to a can 2, the top of the holder 3 having a depending flange or side wall 4. The holder may be of any suitable material such as metal, aluminum, plastic or the like and is here shown to be substantially circular in cross section.

A handle 5 is formed integrally with the top and side 4 of the holder and is turned downwardly extending below the holder and alongside the can when it is applied thereto.

The top 3 is provided with an opening 6 for receiving a tubular spout 7 for dispensing milk 8 from the can 2, the spout 7 being set at an angle as best illustrated in Fig. 4. The top 3 is also provided with an opening 9 which extends through the portion 10 of the handle for receiving a tube 11 providing an air vent for the container when the device is in use. The tube 11 need not extend entirely through the opening 9. The tube 11 and spout 7 have their inner ends tapered to form sharp points 12 and 13 for piercing the top of the can when the holder is inserted over the can.

The tube 11 and spout 7 have a portion of their outer walls knurled or roughened as indicated at 14 and 15, respectively, and are thus of slightly larger diameter so that when the holder is inserted over the can and the top is pierced, the knurled or roughened edges of the tubes will engage the side wall of the openings to retain the holder on the can when the holder is used for dispensing milk from the can. Rubber washers or rings 16 and 17 engage around the tubes 11 and 7, respectively, to provide a seal around the tubes to prevent the milk from leaking therefrom. The underside 20 of the top around the openings 6 and 9 is recessed as indicated at 17' and washers 18 and 19 engage in the recessed portions and around the tubes between the rubber rings and the underneath side 20 of the top 3. The rubber rings or washers engage over the knurled or roughened parts of the tubes.

The spout 7 has an opening 21 near the underneath side of the top 3 which facilitates removal of substantially all of the milk from the can after it has passed the inner point of the spout.

The handle 5 is provided with a recess 22 closed by a cap or the like 23 having a boss 24 adapted to fit in the end recess 22. The boss has a central bore 25 in which is pressed a wire stem or the like 26 provided with a spiral brush 27 for cleaning of the tubes 7 and 11, respectively, as desired.

In operation of the device constructed and assembled as described, the depending flange 4 of the holder and dispenser is inserted over the side wall 28 of the can 2 and the points 12 and 13 of the tubes 11 and spout 7 pierce the top of the can providing openings 29 and 30 in the top of the can. Further downward movement of the holder and dispenser to the position shown in Fig. 3 will cause the knurled portions 14 and 15 of the tubes 7 and 11 to engage the side walls of the openings 29 and 30 as best illustrated in Fig. 3 and this, with angle setting of the spout 7, will retain the holder on the can so that the can may be lifted by the handle 5 and the milk dispensed therefrom through the spout 7. The opening 21 in the spout 7 will be substantially at the top of the can and on the side near the wall of the can so that the milk may enter between the spout and wall and all of the milk may be drained from the can at that point.

It is obvious from the foregoing that I have provided an improved holder and dispenser of milk from cans which may be quickly and easily attached to and detached from the can.

What I claim and desire to secure by Letters Patent is:

1. A dispenser for cans comprising an annular wall and a flat top, said dispenser including a top with a substantially flat under face to conform with the flat top of said can and having an annular flange integral with said top of the dispenser for encircling the top of the can when the flat under face of said top is superimposed over the flat top of the can to embrace the upper portion of the can, said top of the dispenser having openings therethrough on opposite diametrical sides, a tube extending through one of said openings having a can puncturing portion projecting from said flat under face and an outer spout portion for dispensing contents of the can, a vent tube in the other of said openings and having a similar puncturing portion projecting from said flat under face, and gasket rings encircling the tubes and having seating contact with said top in substantially in plane with the flat under face and adapted to seat on the flat top of said can, said puncturing portions of said tubes having ends sloping transversely from outer diametrical sides to terminate at points on the inner diametrical sides thereof in spaced relation with said flat under face, a distance conforming to at least the thickness of the top of the can and the thickness of the gasket rings and having knurling projecting from the circumferential faces of said tubes and into said openings to secure the tubes in said openings and retain the gasket rings in seating contact with said flat under face and to wedge into openings of the top of the can made by said puncturing portions of the tubes to hold the gasket rings in compression and the dispenser embracing the can when the dispenser is applied thereto.

2. A dispenser for cans comprising an annular wall and a flat top, said dispenser including a top with a substantially flat under face to conform with the flat top of said can and having an annular flange integral with said top of the dispenser for encircling the top of the can when the flat under face of said top is superimposed over the flat top of the can to embrace the upper portion of the can, said top of the dispenser having openings therethrough on opposite diametrical sides, a tube extending through one of said openings having a can puncturing portion projecting from said flat under face and an outer spout portion for dispensing contents of the can, a vent tube in the other of said openings and having a similar puncturing portion projecting from said flat under face, gasket rings encircling the tubes and having seating contact with said flat under face and adapted to seat on the flat top of said can, said puncturing portions of said tubes having ends sloping transversely from outer diametrical sides to terminate at points on the inner diamertical sides thereof in spaced relation with said flat under face, a distance conforming to at least the thickness of the top of the can and the thickness of the gasket rings and having knurling projecting from the circumferential faces of said tubes throughout the spaced portions thereof and into said openings to secure the tubes in said openings and retain the gasket rings in seating contact with said flat under face and to wedge into openings of the top of the can made by said puncturing portions of the tubes to hold the gasket rings in compression and the dispenser embracing the can when the dispenser is applied thereto, and backing washers inset in said flat under face of the top for forming said seating contact of the gasket rings.

References Cited in the file of this patent

UNITED STATES PATENTS

| | | |
|---|---|---|
| 1,343,099 | Strongson | June 8, 1920 |
| 2,102,978 | Slining | Dec. 21, 1937 |
| 2,184,632 | Clawson | Dec. 26, 1939 |
| 2,266,570 | Searls | Dec. 16, 1941 |